United States Patent [19]

Hoshikawa et al.

[11] 4,057,090
[45] Nov. 8, 1977

[54] PUNCTURE SEALING PNEUMATIC TIRE

[75] Inventors: Katuyuki Hoshikawa, Honjo; Soji Noda, Takarazuka; Akitaka Kimura, Kobe, all of Japan

[73] Assignee: Sumitomo Rubber Industries, Ltd., Kobe, Japan

[21] Appl. No.: 725,177

[22] Filed: Sept. 21, 1976

[30] Foreign Application Priority Data

Dec. 11, 1975  Japan .................... 50-148121

[51] Int. Cl.² .................... B60C 21/08; B60C 5/14
[52] U.S. Cl. .................... 152/347; 106/33; 156/115; 428/912
[58] Field of Search .................... 152/346, 347, 348; 156/115; 428/912; 106/33

[56] References Cited
U.S. PATENT DOCUMENTS

| | | | |
|---|---|---|---|
| 3,565,151 | 2/1971 | Courtney | 152/347 |
| 3,628,585 | 12/1971 | Pace | 152/347 |
| 3,881,537 | 5/1975 | Miyazato | 152/347 |
| 3,881,943 | 5/1975 | Fuller et al. | 152/347 |
| 3,903,947 | 9/1975 | Emerson | 152/347 |
| 3,935,893 | 2/1976 | Stang et al. | 152/347 |
| 3,952,787 | 4/1976 | Okado et al. | 152/347 |

Primary Examiner—Drayton E. Hoffman
Attorney, Agent, or Firm—Birch, Stewart, Kolasch and Birch

[57] ABSTRACT

Pneumatic tire including a puncture sealing layer which is applied to an inner lining and in which by addition of specific amounts of polyisobutylene and of a particular form of silica with respect to a set amount of polybutene and by use of powdered elastomer having a specific particle size distribution there are achieved optimum values of viscosity and adhesivity and ability to seal even large puncture holes in a wide range of temperature and operating conditions. In addition there is less tendency for puncture sealing layer components to migrate to the inner lining and tire durability is therefore improved.

2 Claims, 6 Drawing Figures

PUNCTURE SEALING PNEUMATIC TIRE

BACKGROUND OF THE INVENTION

The present invention relates to a pneumatic tire and, more particularly, to a pneumatic tire incorporating a puncture sealing layer having improved properties.

There are known various manners of pneumatic tire construction intended to avoid puncture of tires by stones, nails, or other sharp objects. According to one known type of construction, reinforcing means, e.g., so-called breaker layers including metal wire material, for example, which are included in a pneumatic tire made chiefly of rubber or rubber-like material in order to improve resistance of the tire to puncture. However, since from consideration of weight and riding characteristics of the tire, there are practical limits imposed on the size or thickness of such reinforcing means, these means may be unable to prevent particularly long and sharp objects, e.g., nails, from passing therethrough and extending into the inner, air-containing chamber of the tire, which may be constituted by a separate inner tube of extensible rubber material impermeable to air, or by a tire inner wall portion having similar properties, as in the so-called tubeless tire for example. It is therefore also practice to provide a tubeless pneumatic tire with a layer of so-called self-sealing or puncture-sealing material which is very light compared with the weight of the tire as a whole, which is applied on the inner surface of the tire, and, ideally, has properties such that it tends to flow and naturally close a hole formed therein. Conventional composition of such puncture sealing material includes as a principal component polybutene, which is a viscous liquid polymer of low molecular weight, and which, in order to obtain a material having a viscous composition, is mixed with natural rubber or synthetic rubber such as styrene-butadiene copolymer rubber, polybutadiene rubber, butyl rubber, or ethylene-propylene-diene terpolymer rubber. In running tests carried out by the inventors on tubeless tires provided with puncture sealing layers of conventional composition, each tire was pierced with a nail 3.1 mm. in diameter which extended from the tread portion of the tire to and through the puncture sealing layer, tested tires being mounted on automobiles which were then driven for periods of time lasting up to five hours. No leakage of air from nail holes was detected during short runs of one to two hours which were effected immediately after the tires were pierced, but it was found that running the automobiles for five hours at a speed in the range of from 100 to 140 kilometers per hour, i.e., standard cruising speed on a high-speed highway, resulted in nails coming out and a sharp loss of air from tires, or even if nails remained fixed in tires there was leakage of air from around these fixed nails. There was also a sharp loss of air from tires if nails were forcibly removed. Needless to say, both gradual leakage of air and sudden loss of air from a tire can result in bursting of the tire, for example, and can be extremely dangerous.

After concluding the tests, the inventors examined the nail holes formed in the tested tires, and found that, as shown in FIG. 2, puncture sealing material 6' in the immediate vicinity of a nail 9 piercing a tire was pushed radially away from the hole defined by the nail 9, presumably due to movement of the nail 9 during rotation of the tire with the result that instead of the nail 9 being completely enclosed by the sealing material 6', the sealing material 6' defined a hole which was generally centered on the nail 9 and which permitted leakage of air even if the nail 9 remained in the tire. It is evident that as the tire becomes less inflated rotation thereof results in greater movement of the nail 9, with consequent formation of a larger hole. It is thought that such a hole is formed due to a work hardening effect owing to which, after a certain time, the material 6' becomes less plastic and so fails to flow to seal the nail hole.

Another disadvantage of conventional puncture seal material is that it generally has good compatibility with the rubber material constituting the inner lining of the tire, with the result that, particularly in high temperature conditions, the polybutene tends to migrate to and adversely affect the characteristics of the inner tube material.

It is accordingly a principal object of the invention to provide a pneumatic tire having improved puncture sealing characteristics in a wide range of temperature and running conditions.

It is another object of the invention to provide a pneumatic tire wherein there is reduced migration of puncture seal material inner tube material, whereby tire durability is improved.

The manner in which these and other objects are accomplished will be made clear from the following detailed description of the invention when read with reference to the attached drawings, in which FIG. 1 is a transverse sectional view of a pneumatic tire according to the invention;

Figure 5:
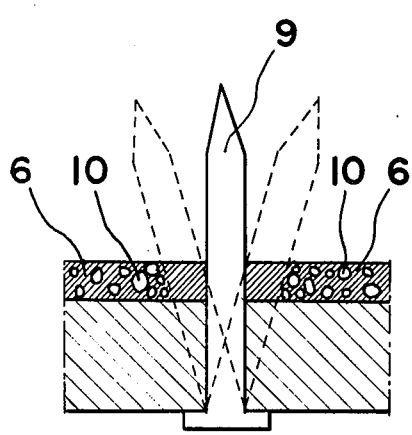
Figure 6:
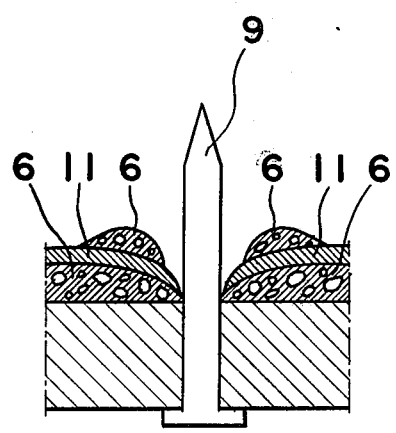

FIG. 5 is a fragmentary sectional view showing conditions in the vicinity of a nail piercing a tire provided with a layer of puncture sealing material having a viscosity value outside a preferred range according to the invention; and FIG. 6 is a fragmentary transverse view showing conditions in the vicinity of a nail piercing a tire provided with a supplementary retainer diaphragm and a puncture sealing layer according to the invention.

Figure 1:
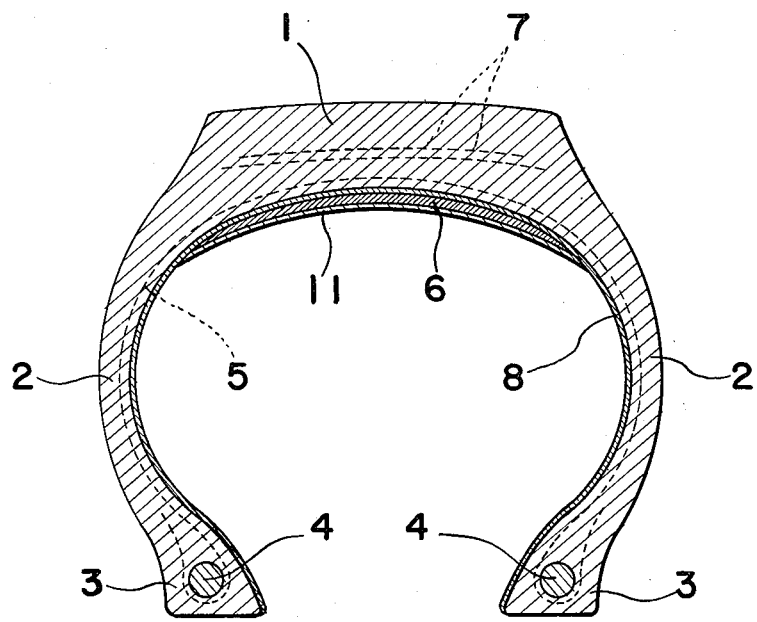
Figure 2:
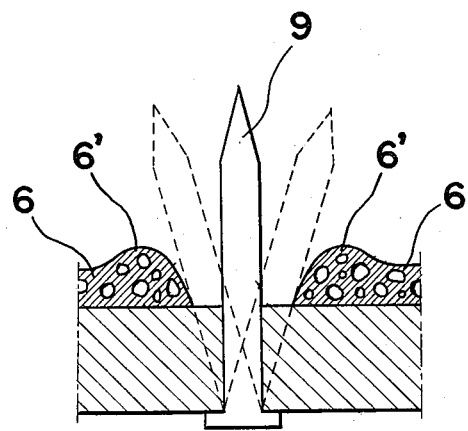
FIG. 2 is a fragmentary transverse sectional view which schematically shows condition at the location of a nail piercing a pneumatic tire provided with a puncture sealing layer of conventional composition.

Referring to FIG. 1 the pneumatic tire of the invention comprises a tread portion 1 which is suitably made of vulcanized rubber, a pair of sidewalls 2 extending downwards from opposite sides of the tread portion 1 and at least one carcass cord layer 5 which extends between and has opposite side portions wrapped around bead assemblies 3 having wire beads 4 embedded therein. The tire also includes breaker strips 7 which are generally equal in width to and are disposed below the tread portion 1 and serve to improve resistance of the tire to penetration by comparatively large objects. The tire is provided on the inner surfaces of the tread portion and sidewalls with an inner lining 8 which is suitably made of rubber and is impermeable to air. On the inner surface of the lining 8 there is applied a puncture sealing layer 6 which extends at least over an area corresponding to the area of the tread portion 1, and is suitably thickest at the portion thereof in line with the crown center line of the tire and decreases exponentially from this portion and terminates generally in line with the top ends of the sidewalls as defined shoulders of the tire. The puncture sealing layer 6 may of course be applied over a greater area of the inner lining 8.

Requirements of properties of the material of the puncture sealing layer 6 are strict, since the material must be sufficiently fluid to flow naturally to fill a hole upon withdrawal of a nail, for example, but must not be so fluid that it is too easily displaced from its applied position on an inner lining. In work to provide an improved puncture sealing material the inventors paid particular attention to this important aspect of the sealing material, and in assessing the quality of material of different compositions made use of a 'viscosity value' and an 'adhesivity value' which were determined as follows.

Figure 3:
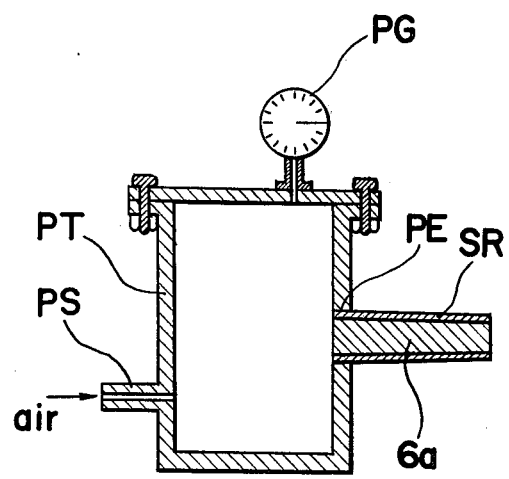
FIG. 3 is a schematic view of equipment employed for determination of the 'viscosity value' of puncture sealing material.

Referring to FIG. 3, to determine viscosity value there is employed a sealed pressure tank PT which is fitted with a pressure gage PG for indication of pressure obtained in the tank PT. To a lower portion of the tank PT there is connected a small-bore supply pipe PS via which air under pressure may be supplied from a suitable compressor means not shown into the tank PT. Air may be exhausted from the tank PT via a larger bore exhaust pipe PE which connects to a generally central portion of the tank PT on the opposite side thereof to the compressed air supply pipe PS, the exhaust pipe PE being out of direct line with the supply pipe PS, and being detachable from the tank PT or fixable thereto in an airtight attachment. The diameter of the exhaust pipe PE decreases gradually with distance from the portion thereof which is attached to the tank PT. Inside the exhaust pipe PE there is mounted a hollow, open-ended sample retainer SR, which likewise has a varying diameter, fits exactly into the exhaust pipe PE, and is filled with puncture sealing material 6a whose viscosity value is to be determined. The length of the sample retainer SR is 41 mm., the largest portion thereof, which comes nearest to the pressure tank PT, has an internal diameter of 6.5 mm., and the smallest, opposite end portion thereof has an internal diameter of 5.25 mm. Pressure in the tank PT is initially atmospheric pressure, and after the exhaust pipe PE and the sample retainer SR filled with puncture sealing material 6a have been mounted in connection with the tank PT, pressure in the tank PT is increased by 0.5 kg./cm.² once every 30 seconds, while the reading of the pressure gage PG is observed. When a certain pressure is reached in the tank PT, almost all the sample material 6a is forced out of the sample retainer SR, and there is therefore a sudden fall of pressure in the tank PT. For each sample of puncture sealing material 6a, the pressure which was achieved in the tank PT immediately prior to this sudden fall is taken to represent the viscosity value of material 6a.

Figure 4:
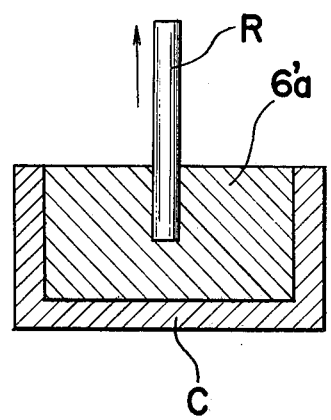
FIG. 4 is a schematic view of equipment employed for determination of the 'adhesivity value' of puncture sealing material.

Referring now to FIG. 4, to determine the adhesivity value of puncture sealing material, a circular container C 20 mm. deep and 40 mm. in diameter is filled with puncture sealing material 6a', in standard room temperature conditions of 25° C. A 10 mm. length of a rod R made of metallic material and having a diameter of 5.1 mm. is inserted into the sample of puncture sealing material 6a'. The rod R is then withdrawn at a set speed, suitably 500 mm. per second, and adhesivity is expressed in terms of the weight in milligrams of material 6a' remaining in adherence to the rod R after complete withdrawal of the rod R from the space defined by the container C.

It was found in the course of research and tests that a requirement for achievement of the improved puncture sealing results described below is that the viscosity value be in the range of from 2.0 to 4.5 and the adhesivity value be 100 or higher. Another requirement is that the puncture sealing have no adverse effect on durability of a tire. Considering first durability and the adhesivity value, favorable results are obtainable by making an addition of polyisobutylene to a mixture constituting a puncture seal material. Examples of the composition are given in Table 1, in which A is a conventional composition, and B and C are compositions according to the invention, and figures noted indicate proportions by weight.

Table 1

| Proportion | compositions of sample material | | |
|---|---|---|---|
| | A | B | C |
| Polybutene | 100 | 70 | 60 |
| Polyisobutylene | — | 30 | 40 |
| Aerogel (colloided silica) | 16 | 16 | 16 |
| Powdered rubber | 30 | 30 | 30 |
| Swell (%) (for 10 days at 80° C) | 15 | 7 | 3 |

Polybutene employed as a constituent in puncture sealing material of the invention is a hydraulic, viscous polymer having an average molecular weight of 100 to 1500, as determined by the procedure according to ASTM D2503, while the polyisobutylene is preferably a highly consistent, semisolid with a viscosity-average molecular weight in the range of from 8000 to 10000. Since polyisobutylene and polybutene are very compatible, there is much less tendency for polybutene to migrate to the rubber of a tire inner lining, and there can therefore be expected to be an improved durability of the tire. This was confirmed by tests using a drum driving test machine which were conducted on tires provided with puncture sealing layers having the various compositions noted in Table 1. Defective portions appeared in the inner linings of tires for which Composition A was employed after the tires had been run for the equivalent of approximately 2000 kilometers. In contrast to this, when either Composition B or Composition C was employed as a puncture sealing material the rubber of tire inner linings displayed no defects even after the tires had been run for the equivalent of approximately 3000 kilometers.

The tires employed in this test and other tests described below were tubeless tires whose nominal dimensions are the standard of 185/70 HR 13 and which include steel breaker layers and radially applied carcass reinforcement plies constituted by strong synthetic fiber cords.

The effect had on the adhesivity value by varying the amount of added polyisobutylene may be appreciated from examination of Table 2 and Table 3 below. As in Table 1, the figures noted in Table 2 and Table 3 and also in the description below indicate proportions by weight.

In the tire of the invention it is desirable that characteristics of the puncture sealing layer be such that the layer is not liable to move, under the simple effects of temperature, for example, when a vehicle fitted with the tire is stationary, in a garage, etc., but that when the vehicle is moving portions of the layer contacted by a nail or similar object piercing the tire may be rendered effectively fluid by the combined effect of shearing stress imposed thereon by the nail moving as the tire rotates or as the nail is pulled out and of centrifugal force resulting from tire rotation, and so may flow to seal the nail hole. To achieve such characteristics there is suitably included in the puncture sealing material mixture a thixotropic, or thickening, agent, which according to the invention is in the form of silicic anhydride with a silicic acid content of at least 99% and with less than 1.5% loss on drying. The effect of adding different amounts of such silicic anhydride is shown in Table 2.

Table 2

| Proportion | Sample No. | | | | | | | |
|---|---|---|---|---|---|---|---|---|
| | 1 | 2 | 3 | 4 | 5 | 6 | 7 | 8 |
| Polybutene | 100 | 100 | 100 | 100 | 100 | 100 | 100 | 100 |
| Polyisobutylene | 70 | 70 | 70 | 70 | 70 | 70 | 70 | 70 |
| Silicic anhydride | 12 | 14 | 16 | 18 | 24 | 26 | 28 | 30 |
| Powdered rubber | 70 | 70 | 70 | 70 | 70 | 70 | 70 | 70 |
| Viscosity value | 1.0 | 1.5 | 2.0 | 2.5 | 4.0 | 4.5 | 5.0 | 5.7 |

Table 3

| Proportion | Sample No. | | | | |
|---|---|---|---|---|---|
| | 9 | 10 | 11 | 12 | 13 |
| Polybutene | 100 | 100 | 100 | 100 | 100 |
| Polyisobutylene | 0 | 40 | 60 | 80 | 100 |
| Silicic anhydride | 25 | 29 | 31 | 33 | 35 |
| Powdered rubber | 30 | 42 | 48 | 54 | 60 |
| Adhesivity value | 30 | 100 | 150 | 200 | 250 |

Samples 1 through 8 shown in Table 2 in which viscosity value was changed by variation of the amount of added silicic anhydride had adhesivity values in the range of from 150 to 250.

Similarly, Samples 9 through 13 shown in Table 3, which were employed principally to determine the effect of varied amounts of polyisobutylene on adhesivity value, had viscosity values in the range of from 2.5 to 3.5.

In practicing the invention it is most preferable that the form of silica included in the puncture sealing material be as specified above, in order that the thickening process be very little affected by seasonal variation of ambient temperature or variation in manufacturing conditions. With other forms of silica, it is not always possible to guarantee obtaining requisite viscosity values. For example, in employing silica which had been obtained by wet process, had a silicic acid content of less than 90%, and displayed more than 5% loss on drying, mixing 15 parts of silica in a mixture whose other components were as shown for Samples 1 through 8 of Table 2 resulted in a viscosity value of 2.0 when the mixing took place at a temperature of 30° C, but when the mixing temperature was 120° C it was found that after slow cooling there was practically no thickening effect and viscosity value was less than 0.5.

Test tires of the previously noted type were provided with puncture sealing layers having the compositions indicated for Sample Nos. 1 through 13 in Tables 2 and 3, different tires having puncture sealing layers of different compositions, and each sealing layer being 3 millimeters thick at its thickest portion. Each tire was pierced with 50 nails each having a diameter of 3.1 millimeters and extending from the tread portion of the tire and passing through the puncture sealing layer of the tire. Each tire was then run on a standard testing machine for 1000 kilometers at a speed of 10 kilometers per hour, after which all the nails were withdrawn therefrom and inspection was made to determine whether there was leakage of air from the nail holes. Results of this test are shown in Table 4 and Table 5.

Table 4

| Proportion | Sample No. | | | | | | | |
|---|---|---|---|---|---|---|---|---|
| | 1 | 2 | 3 | 4 | 5 | 6 | 7 | 8 |
| Viscosity value | 1.0 | 1.5 | 2.0 | 2.5 | 4.0 | 4.5 | 5.0 | 5.7 |
| Number of completely sealed nail holes | 0 | 24 | 46 | 50 | 50 | 45 | 23 | 0 |

Table 5

| Proportion | Sample No. | | | | |
|---|---|---|---|---|---|
| | 9 | 10 | 11 | 12 | 13 |
| Adhesivity value | 30 | 100 | 100 | 200 | 250 |
| Number of completely sealed nail holes | 0 | 46 | 50 | 50 | 50 |

As seen from Table 4, Sample Nos. 1 and 8, with viscosity values of 1.0 and 5.7, respectively, were totally ineffective in sealing punctures, and when the material employed for puncture sealing layers was that of Sample Nos. 1, 2 and 7, 8 with viscosity values of 1.0, 1.5 and 5.0, 5.7, respectively, there was leakage of air from more than half the nail holes. Employment of the material of Sample Nos. 3 to 6, however, with viscosity values ranging from 2 to 4.5 resulted in sealing of all or almost all the nail holes.

From Table 5 it is seen that there was leakage from all nail holes when the material of Sample No. 9, with an adhesivity value of 30, was employed, but nearly all holes were sealed when the adhesivity value of the material was 100, as for Sample No. 10, and all holes were sealed when the material had an adhesivity value greater than 150, as for Sample Nos. 11, 12, and 13.

From the above results therefore it was determined that the optimum range of viscosity value of puncture sealing material is from 2.0 to 4.5 and that the adhesivity value should be at least 100. With these values of viscosity and adhesivity it was found that puncture sealing material has excellent characteristics with respect to adhesion to a nail or similar object piercing a tire and to being sufficiently fluid to move to fill a hole formed by a nail but sufficiently viscous to keep the hole sealed in a wide range of tire rotatory speed and in widely different temperature conditions. Additional tests showed that if the proportion of polyisobutylene to that of polybutene is greater than 150 to 100, even though a satisfactory adhesivity value is achieved, it is difficult to maintain the viscosity value of the puncture sealing material in the preferred range.

To achieve values in the preferred ranges both for viscosity and adhesivity in puncture sealing material according to the invention, for 100 parts of polybutene the amount of polyisobutylene is in the range of from 40 to 150 parts and that of silicic anhydride is in the range of from 5 to 40 parts, these proportions being determined by consideration of the abovementioned results of durability tests conducted on tires provided with puncture sealing layers having the compositions shown in Table 1, as well as of the test results shown in Tables 4 and 5.

It is well known that, if the amount of silicic anhydride for 100 parts of polybutene is smaller than 5 parts, the viscosity in puncture sealing material is so excessive that the sealing material may flow out from the hole produced in a tire by a nail, while, if that of silicic anhydride is larger than 40 parts, the sealing material cannot seal the space disposed between the hole and the nail piercing in a tire due to the insufficiency of the viscosity of the sealing material.

Execution of further tests on tires with puncture sealing layers in which constituents were in the proportions indicated in Tables 2 and 3, but in which the rubber employed was not in powdered form, showed that even if viscosity value and adhesivity value were in the preferred ranges, when the tires were run for long periods with nails still embedded therein there was growth of nail holes, and within a period of several minutes to 30 minutes after the nails were removed there was a sudden leakage of air from the nail holes. It was therefore concluded that, as well as achievement of viscosity and adhesivity values in the preferred ranges, use of rubber in powdered form is an important factor in obtaining improved puncture sealing material. Further research showed that, presuming the viscosity value and adhesivity value are in the preferred ranges, best puncture sealing results are obtained when the proportion of powdered rubber is of the order of 25 to 90 parts to 100 parts of polybutene and the rubber powder has a particle size in the range of from 5 to 30 mesh, sieve size being that specified by JIS of Japan.

The term "rubber" is herein intended to include synthetic rubber or similar elastomeric material, as well as natural rubber.

It is thought that when powdered rubber having the abovenoted definite particle size distribution is included in puncture sealing material, if a hole produced in a tire by a nail is comparatively large, the particles of rubber moves first to block or partially block the hole, and afterwards the other, non-granular, viscous portion moves in to completely block the hole, i.e., the particles of rubber act to bridge the space between the edge portions of the hole and the nail if the nail remains embedded in the tire, or between different edge portions of the hole if the nail is removed, either deliberately or due to movement of the tire, the particles of rubber thus acting as a support for the remaining portions of the sealing material which are too weak to bridge over a comparatively large hole alone. Also, by employment of powdered rubber having a definite range of particle size, holes having a definite range of sizes may be effectively bridged.

However, even when the above noted proportion of the abovenoted particle size distribution is included in the puncture sealing material, puncture sealing material is ineffective if the puncture sealing material is too fluid. For example, there were employed as puncture sealing layer material preparations which, for 100 parts of polybutene, included from 25 to 90 parts of rubber powder, urethane foam powder, or similar elastomer powder in which the 5 to 10 mesh sieve fraction and the 20 to 30 mesh sieve fraction variously constituted from 20% to 60% of the total powder component. These preparations also had admixed therein polyisobutylene and silicic anhydride, but in each case the proportions of these components were such that the viscosity value of the puncture sealing material was less than 2.0. When these preparations were applied to the inner linings of tires and the tires were run at high speed while having nails embedded therein, the result was, as shown in FIG. 5, that only the particles of powdered rubber 10 were pushed radially away from the area of the hole formed by a nail 9, and the hole was filled with the remaining, more fluid portion of the sealing layer alone. In this situation, there was leakage of air when the nail 9 fell out during rotation of the tire, or was forcibly removed by the driver.

To summarize therefore, in the tire of the invention for 100 parts of polybutene a puncture sealing layer preferably includes 40 to 150 parts of polyisobutylene, 5 to 40 parts of silicic anhydride which has a silicic acid content of at least 99% and whose loss on drying does not exceed 1.5%, and 25 to 90 parts of powdered rubber or elastomer having a particle size in the range of from 5 to 30 mesh, the viscosity value of the puncture sealing layer being made from 2.0 to 4.5 and the adhesivity value thereof at least 100.

As tires are required to afford effective puncture sealing in a wide range of temperature conditions and to provide good service for a long time in these varying conditions, a series of tests A through E, described below, were conducted in order to determine qualities of the tires of the invention in respect to such requirements. In the driving tests in this series, instead of test machines being used tires were fitted on vehicles which were driven around a test track. The puncture sealing layers of the tested tires had the general composition shown in Table 6, there being added to the basic constituents required in puncture sealing material according to the invention, small amounts of aging resistor, red oxide to improve temperature resistance and migration resistance characteristics, and carbon black to impart toughness.

Table 6

| Proportion | (Proportion by weight) |
|---|---|
| Polybutene | 100 |
| Polyisobutylene | 80 |
| Aerogel (colloidal silica) | 16 |
| Powdered rubber 5 – 10 mesh sieve fraction | 27 |
| Powdered rubber 10 – 20 mesh sieve fraction | 18 |
| Powdered rubber 20 – 30 mesh sieve fraction | 18 |
| Aging resistor RD | 1 |
| Red oxide | 1 |
| Carbon black | 0.3 |
| Viscosity value | 3.0 |
| Adhesivity value | 200 |

Test A

This test was conducted to determine whether or not punctures are effectively sealed in the tires of the invention when vehicles fitted with the tires are driven for long periods at medium to high cruising speeds. Test tires were pierced with nails ranging in diameter from 1.3 to 3.4 millimeters, and were run for 700 kilometers at speeds in the range of from 60 to 140 kilometers per hour. After completion of the 700-kilometer runs, nails remaining embedded in tires were removed, and all nail holes were inspected for leakage of air. Results of the test are shown in Table 7 in which a circle 0 indicates that a nail was still embedded in a tire upon termination of the 700-kilometer runs and that no leakage of air was detected, and a triangle Δ indicates that a nail came out or was removed prior to termination of the run and no leakage of air was detected.

Table 7

| Vehicle speed (km./hr.) | | 60 | 80 | 100 | 120 | 140 |
|---|---|---|---|---|---|---|
| | 1.3 (mm.) | 0 | 0 | 0 | 0 | 0 |
| | 2.1 | 0 | 0 | 0 | 0 | 0 |
| Nail dia | 2.8 | 0 | 0 | 0 | 0 | 0 |
| | 3.1 | 0 | 0 | 0 | Δ | Δ |
| | 3.4 | 0 | 0 | 0 | Δ | Δ |

As seen from the above table, there was no leakage from any nail holes, even when tires were pierced with nails having the large diameters 3.1 millimeters and 3.4 millimeters and were run at speeds as high as 120 km./hr. and 140 km./hr., and even if nails came out before termination of a 700-kilometer run.

Test B

In this test each tire was pierced with a nail having a diameter of 3.1 millimeters, after which the nails were forcibly withdrawn in the conditions indicated in Table 8 and examination was made to determine effectiveness of puncture sealing.

Table 8

| Test conditions | Test results |
| --- | --- |
| Nail removed immediately after insertion | no leakage of air |
| Nail removed after a 2000 km. run at 80 km./hr. (tire temperature: 80° C) | " |
| Tire left for 24 hours after completion of 2000 km. run at 80 km./hr., then nail removed | " |
| Tire cooled to −15° C after completion of 2000 Kgm. run at 80 km./hr., then nail removed | " |

This test showed that puncture sealing material having the above disclosed composition gives first-rate results in a wide range of conditions. This was confirmed by a subsequent accelerated test, Test C.

Test C

The tires employed in this test were those employed in Test A which had been pierced with nails 3.1 millimeters in diameter and then run for 700 kilometers at a speed of 100 kilometers per hour. After completion of the 700-kilometer runs and inspection, vehicles fitted with these tires were driven for a distance somewhat in excess of 250 miles per day for 45 days, during which time average ambient temperature was approximately 35° C. Initial internal pressure of the tires was 1.9 kg./cm.². Upon completion of the run, when the vehicles had travelled 10,200 km., tire pressure was checked again and was found to be on an average 1.8 kg./cm.², i.e., only slightly less than initial pressure. The puncture sealing layers were also examined but no deformation thereof was found, and no change in viscosity value or adhesivity value thereof was detected.

Subsequently, other tires which had been pierced with 3.1 mm. diameter nails and employed in Test A were run for 10,350 km. in winter conditions when average ambient temperature was 0° C. After completion of this run tire pressure was found to be 1.7 kg./cm.² on an average, which is very little less than initial tire pressure of 1.9 kg./cm.², and no change in viscosity value or adhesivity value of puncture sealing layers was detected.

Test D

In this test, tires were pierced with nails 3.1 mm. in diameter and then run at a speed of 100 km./hr. until they had covered a distance of 1,716 km., at which point the nails were removed. After this, without any repair to nail holes being effected, the tires were run for a further 8,200 km. at the same speed, after which tire pressure was checked and was found to be an average of 1.8 kg./cm.², only very little less than the initial pressure of 1.9 kg./cm.².

Test E

This also was an accelerated test to assess durability. Test tires provided with puncture seal layers having the composition indicated in Table 6 were left for approximately 3 months in an oven maintained at a temperature of 80° C. After this the puncture sealing layers were examined, and there was found to be no deformation thereof or change in the viscosity value or adhesivity value thereof.

As is clear from the above, performance of the tire of the invention with respect to puncture sealing is outstanding in a wide range of conditions. In addition to this the tire gives long periods of service without deterioration of characteristics, or shift of the puncture sealing layer, leading to conditions of unbalance, due to centrifugal force. The invention thus makes considerable contribution to prevention of tire burst or similar accident.

Needless to say, to provide extra protection for the puncture sealing layer 6, particularly during tire forming work or mounting of a tire for example, there may be provided over the entire inner surface thereof, i.e., the surface thereof which is innermost with respect to the tire and is opposite to the surface thereof in contact with the rubber inner lining 8 of the tire, a retainer diaphragm 11 constituted by fine bonded particles of rubber or fine fiber, for example, as shown in FIG. 1. The retainer diaphragm 11 may of course define a series of cells in which puncture sealing material is contained, as known conventionally.

In a conventional tire provided with such a diaphragm when the tire is pierced with a nail 9 for example, there is a tendency for the material of the sealing layer 6 to be pushed to the opposite side of the retainer diaphragm 11 by pressure exerted thereon due to movement of the nail 9, as illustrated in FIG. 6. As a result of this, the area surrounding the nail 9 becomes depleted of sealing material and so leakage of air is permitted. With the puncture sealing layer of the invention, however, it has been found that movement of a nail piercing a tire causes the material of the retainer diaphragm 11 and the material of the puncture sealing layer 6 to be mixed and produce a material which remains in good adherence to the nail and retains a viscosity value in the preferred range.

Although the present invention has fully been described by way of the examples with reference to the accompanying drawings, it is to be noted that various changes and modifications are apparent to those skilled in the art. Such changes and modifications, unless they depart from the true scope of the present invention, are to be construed as included within the scope of the present invention.

What is claimed is:

1. A puncture sealing pneumatic tire comprising in combination a carcass constituted by at least one cord layer, a hard rubber tread portion and sidewalls superimposed on said carcass, at least one breaker layer, rubber inner lining impermeable to air, and a puncture sealing layer which is applied on the inner surface of said inner lining, extends at least over an area corresponding to the area of said tread portion, and has a composition including polybutene, polyisobutylene, silicic anhydride of 5–40 parts by weight to 100 parts by weight of polybutene having a silicic acid content of at least 99% and displaying a loss on drying not exceeding 1.5%, and powdered elastomer material having a particle size distribution in the range of from 5 to 30 mesh sieve size, said polyisobutylene, said silicic anhydride, and said powdered elastomer material being respectively included in the range of from 40 to 150 parts by weight, in the range of from 5 to 30 parts by weight, and in the range of from 25 to 90 parts by weight to each of 100 parts by weight of said polybutene, whereby said puncture sealing material has a viscosity value in the range of from 2.0 to 4.5 and an adhesivity value of at least 100.

2. Puncture sealing pneumatic tire as claimed in claim 1, which further includes a retainer diaphragm constituted by fine particle material which is applied over the entire inner surface of said puncture sealing material.

* * * * *